(12) United States Patent
Mizuno

(10) Patent No.: US 9,177,357 B2
(45) Date of Patent: Nov. 3, 2015

(54) METHOD FOR CREATING COEFFICIENT TABLE AND IMAGE SCALING PROCESSOR

(71) Applicant: MegaChips Corporation, Osaka-shi (JP)

(72) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/306,716

(22) Filed: Jun. 17, 2014

(65) Prior Publication Data

US 2015/0003755 A1    Jan. 1, 2015

(30) Foreign Application Priority Data

Jun. 28, 2013   (JP) ................................. 2013-135791

(51) Int. Cl.
*G06T 3/40*       (2006.01)

(52) U.S. Cl.
CPC ................................... *G06T 3/4007* (2013.01)

(58) Field of Classification Search
CPC .. G06T 3/4007; G06T 11/001; H04N 19/132; H04N 19/587; H04N 19/80; H04N 19/523
See application file for complete search history.

(56) References Cited

U.S. PATENT DOCUMENTS

| | | | | |
|---|---|---|---|---|
| 5,652,831 A | * | 7/1997 | Huang et al. | 345/604 |
| 6,064,444 A | * | 5/2000 | Miyazaki et al. | 348/581 |
| 2004/0125387 A1 | * | 7/2004 | Nagao et al. | 358/1.2 |
| 2005/0228651 A1 | * | 10/2005 | Wang et al. | 704/207 |
| 2007/0293960 A1 | * | 12/2007 | Fujii | 700/94 |
| 2010/0220111 A1 | * | 9/2010 | Stauder et al. | 345/604 |
| 2011/0200099 A1 | * | 8/2011 | Kim et al. | 375/240.02 |
| 2013/0249600 A1 | * | 9/2013 | Hashida et al. | 327/63 |

FOREIGN PATENT DOCUMENTS

| | | |
|---|---|---|
| JP | 10-63826 | 3/1998 |
| JP | 2000-165664 | 6/2000 |

* cited by examiner

*Primary Examiner* — Jingge Wu
(74) *Attorney, Agent, or Firm* — Oblon, McClelland, Maier & Neustadt, L.L.P.

(57) ABSTRACT

An image scaling processor includes a coefficient table storing interpolation coefficients, a multiplier that multiplies each of pieces of pixel data constituting input image data and each of the interpolation coefficients stored in the coefficient table, an adder that repeatedly adds pieces of multiplied data output from the multiplier and obtains a total sum of the pieces of multiplied data for a predetermined number of the pieces of pixel data, a selector that outputs a total sum of the pieces of multiplied data at a timing at which the total sum of the pieces of multiplied data is obtained for the predetermined number of the pieces of pixel data, and a shift circuit that shifts an output of the selector to adjust a bit count of the output image data to a bit count of the input image data.

8 Claims, 8 Drawing Sheets

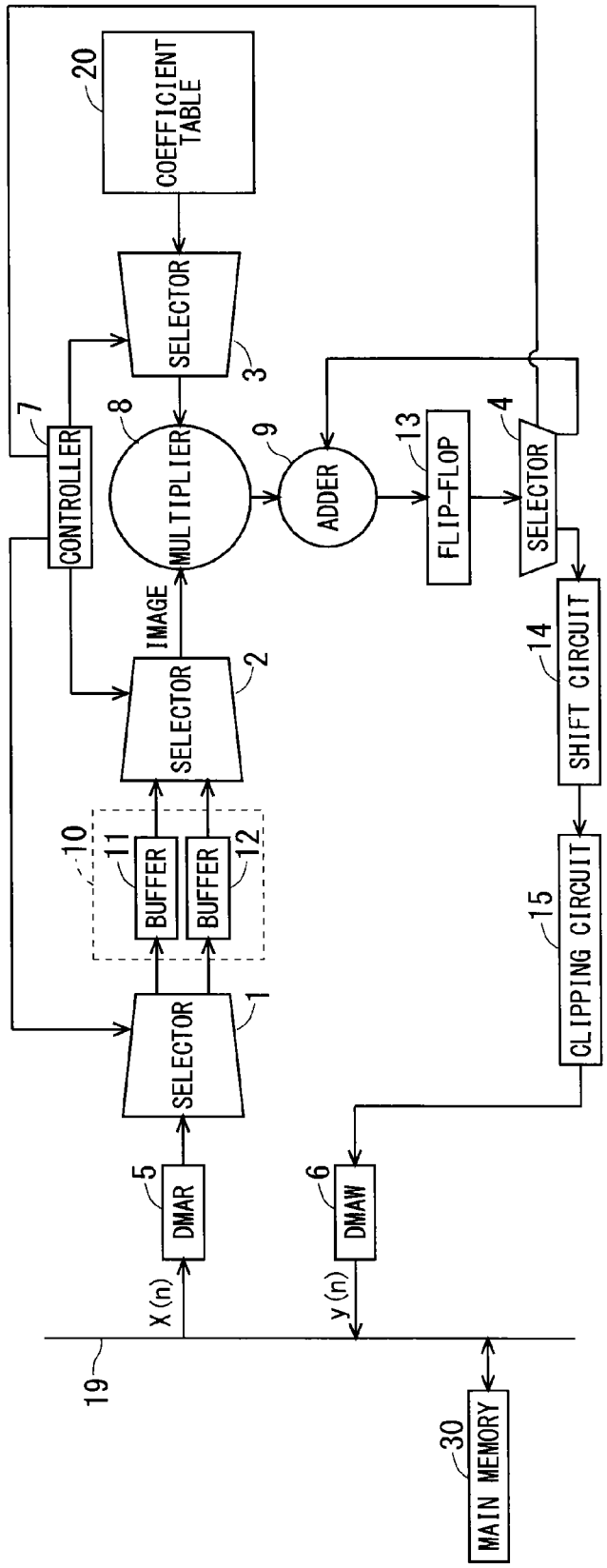
F I G . 7

F I G . 1 4
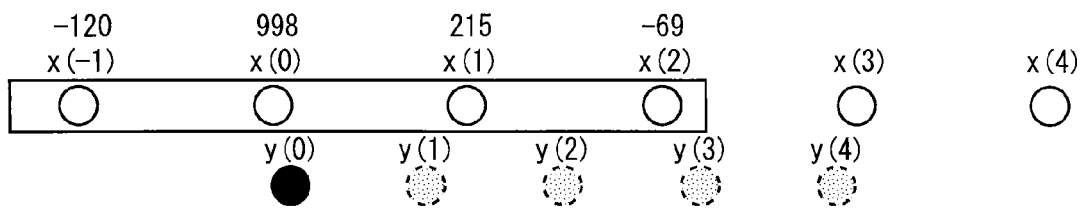
F I G . 1 5
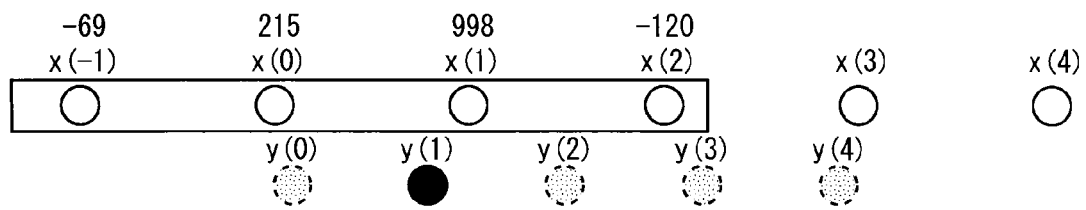
F I G . 1 6
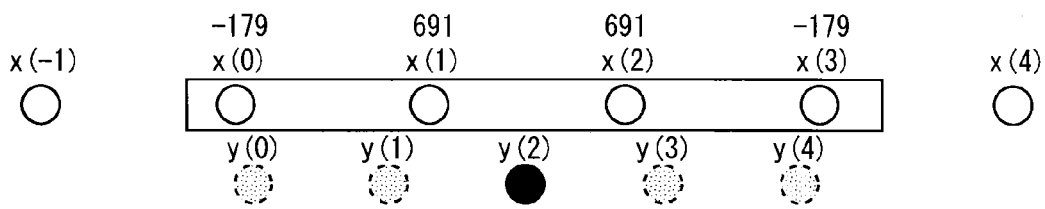
F I G . 1 7
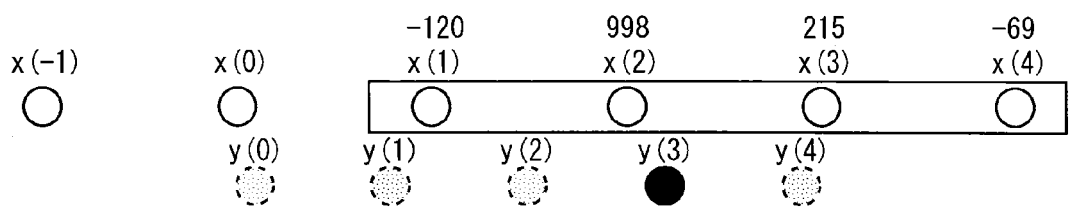

F I G . 1 8

| SEQUENCE | COEFFICIENT (TAP) | | | | SKIP |
|---|---|---|---|---|---|
| 0 | −120 | 998 | 215 | −69 | 1 |
| 1 | −69 | 215 | 998 | −120 | 0 |
| 2 | −179 | 691 | 691 | 179 | 1 |

F I G . 1 9

| SEQUENCE | COEFFICIENT | | | | SKIP |
| | $h(t_i)'$ | $h(t_{i+1})'$ | $h(t_{i+2})'$ | $h(t_{i+3})'$ | |
|---|---|---|---|---|---|
| 0 | 142 | 920 | −66 | 28 | 1 |
| 1 | 28 | −66 | 920 | 142 | 0 |
| 2 | 154 | 358 | 358 | 154 | 1 |

METHOD FOR CREATING COEFFICIENT TABLE AND IMAGE SCALING PROCESSOR

BACKGROUND OF THE INVENTION

1. Field of the Invention

The present invention relates to a method for creating an interpolation coefficient table and to an image scaling operation device having a coefficient table created based on the method for creating a coefficient table.

2. Description of the Background Art

As disclosed in Japanese Patent Application Laid-Open No. 10-63826 (1998), typical image scaling processors follow the procedure of scaling up an original image to U times and then scaling down the image to 1/D times, to thereby perform a U/D-times arbitrary scaling process, U/D-times including integral multiple as well as a rational multiple. Unfortunately, this method requires the operation for scaling up an original image to U times as well as a memory for storing image data scaled up to U times, resulting in redundant operation and memory.

Japanese Patent Application Laid-Open No. 2000-165664 discloses the technology of directly obtaining a final image (U/D-times image) without obtaining an intermediate image (U-times image) from an original image, which solves the above-mentioned redundancy problem. However, this technology uses a conventional technique for an interpolation process, requiring a divider and a floating point unit.

As described above, the conventional image scaling process requires a divider and a floating point unit, and accordingly, the device configuration becomes complicated.

SUMMARY OF THE INVENTION

The present invention provides a method for scaling an image by an arbitrary multiple without using a divider and a floating point unit.

A first aspect of a method for creating a coefficient table according to the present invention relates to a method for creating a coefficient table storing interpolation coefficients to be used in an image scaling process of converting input image data to U/D times (U and D are natural numbers) as output image data, and the method includes the steps of: (a) designing a filter having a transfer function for simultaneously performing conversions into U times and 1/D times; (b) converting interpolation coefficients defined by an impulse response of the filter into integers to calculate integer-converted interpolation coefficients; and (c) sorting the integer-converted interpolation coefficients in a sequence to be used in the process of converting input image data to U/D times and storing the integer-converted interpolation coefficients in the coefficient table, wherein: the step (b) includes the steps of: (b-1) multiplying each of the interpolation coefficients by 2 raised by a predetermined number, and rounding off, rounding down, or rounding up the interpolation coefficient to convert the interpolation coefficient into an integer; and (b-2) partitioning the integer-converted interpolation coefficients for every pixels equal to a predetermined number of pixels among a plurality of pieces of pixel data constituting the input image data, and adding or subtracting one to and from each of the integer-converted interpolation coefficients partitioned such that a total sum of the integer-converted interpolation coefficients partitioned is equal to 2 raised by the predetermined number; and the step (c) includes the steps of: (c-1) partitioning the integer-converted interpolation coefficients such that the plurality of pieces of pixel data are individually multiplied by the integer-converted interpolation coefficients for every the predetermined number of pixels; (c-2) storing the integer-converted interpolation coefficients partitioned in the coefficient table in a predetermined sequence such that in the predetermined sequence, the plurality of pieces of pixel data are repeatedly multiplied by the integer-converted interpolation coefficients partitioned; and (c-3) associating the number of skips with the integer-converted interpolation coefficients partitioned to store the number of skips in the coefficient table, the number of skips defining whether to skip the integer-converted interpolation coefficients partitioned for a predetermined number of pixels and multiply the plurality of pieces of pixel data by the integer-converted interpolation coefficients partitioned or to multiply the plurality of pieces of pixel data by the integer-converted interpolation coefficients partitioned without skip.

A second aspect of the method for creating a coefficient table according to the present invention relates to a method for creating a coefficient table storing interpolation coefficients to be used in an image scaling process of converting input image data to U/D times (U and D are natural numbers) as output image data, and the method includes the steps of: (a) designing a filter by an interpolation function for conversion to U/D-times; (b) converting interpolation coefficients defined by the interpolation function into integers to calculate integer-converted interpolation coefficients; and (c) sorting the integer-converted interpolation coefficients in a sequence to be used in the process of converting input image data to U/D times and storing the integer-converted interpolation coefficients in the coefficient table, wherein: the step (b) includes the steps of: (b-1) multiplying each of the interpolation coefficients by 2 raised by the predetermined number, and rounding off, rounding down, or rounding up the interpolation coefficient to convert the interpolation coefficient into an integer, and subtracting each of the integer-converted interpolation coefficients from the 2 raised by the predetermined number to convert the interpolation coefficient into an integer; and (b-2) partitioning the integer-converted interpolation coefficients for every pixels equal to a predetermined number of pixels among a plurality of pieces of pixel data constituting the input image data, and adding or subtracting one to and from each of the integer-converted interpolation coefficients partitioned such that a total sum of the integer-converted interpolation coefficients partitioned is equal to 2 raised by the predetermined number; and the step (c) includes the steps of: (c-1) partitioning the integer-converted interpolation coefficients such that the plurality of pieces of pixel data are individually multiplied by the integer-converted interpolation coefficients for every the predetermined number of pixels; (c-2) storing the integer-converted interpolation coefficients partitioned in the coefficient table in a predetermined sequence such that in the predetermined sequence, the plurality of pieces of pixel data are repeatedly multiplied by the integer-converted interpolation coefficients partitioned; and (c-3) associating the number of skips with the integer-converted interpolation coefficients partitioned to store the number of skips in the coefficient table, the number of skips defining whether to skip the integer-converted interpolation coefficients partitioned for a predetermined number of pixels and multiply the plurality of pieces of pixel data by the integer-converted interpolation coefficients partitioned or to multiply the plurality of pieces of pixel data by the integer-converted interpolation coefficients partitioned without skip.

In a third aspect of the method for creating a coefficient table according to the present invention, in the step (c-2), the integer-converted interpolation coefficients partitioned are repeatedly multiplied in the predetermined sequence in cycles corresponding to the U times.

In a fourth aspect of the method for creating a coefficient table according to the present invention, in the step (b-1), the predetermined number by which 2 is raised is defined by a bit count of the pixel data.

An aspect of an image scaling processor according to the present invention is an image scaling processor that converts input image data to U/D times (U and D are natural numbers) as output image data, which includes: a coefficient table storing interpolation coefficients created by the method for creating a coefficient table according to the first or second aspect; a multiplier that multiplies each of pieces of pixel data constituting the input image data and each of the interpolation coefficients stored in the coefficient table; an adder that repeatedly adds pieces of multiplied data output from the multiplier and obtains a total sum of the pieces of multiplied data for a predetermined number of the pieces of pixel data; a selector that outputs a total sum of the pieces of multiplied data at a timing at which the total sum of the pieces of multiplied data is obtained for the predetermined number of the pieces of pixel data; and a shift circuit that shifts an output of the selector to adjust a bit count of the output image data to a bit count of the input image data.

The present invention is capable of scaling an image by an arbitrary multiple without using a divider and a floating point unit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram showing a basic configuration of an image scaling processor according to an embodiment of the present invention;

FIG. 14 shows calculation results of y(0);

FIG. 15 shows calculation results of y(1);

FIG. 16 shows calculation results of y(2);

FIG. 17 shows calculation results of y(3);

FIG. 18 shows an exemplary coefficient table; and

FIG. 19 shows another exemplary coefficient table.

DESCRIPTION OF EMBODIMENT

Introduction

The image scaling process on which the present invention is premised is described prior to the description of an embodiment.

<Example Using Transfer Function>

First, the procedure of a U/D-times arbitrary scaling process in which redundancy is eliminated is described as an exemplary image scaling process using a transfer function.

Figure 1:
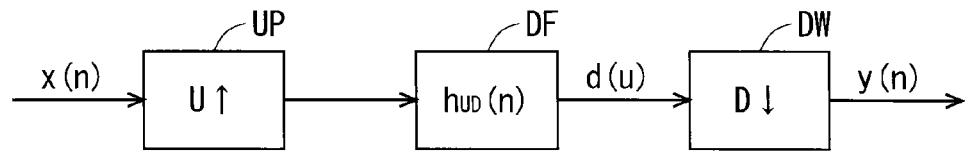
FIG. 1 is a block diagram schematically showing a U/D-times arbitrary scaling process.

FIG. 1 is a block diagram schematically showing a U/D-times arbitrary scaling process, which is designed such that input image data x(n) is input to an up-sampler UP, the up-sampled image data is provided to a digital filter DF being a lowpass filter, image data d(n) whose band is limited by the digital filter DF is provided to a down-sampler DW, and down-sampled output image data y(n) is output.

The up-sampler UP performs a process of interpolating zero values for U−1 pixels between signals of an original image signal. The down-sampler DW performs a process of leaving every D-pixel from image data and thinning out the other pixels. An impulse response of the digital filter DF is $h_{UD}(n)$, and the process of FIG. 1 is expressed by Expression (1) below representing a convolution operation.

$$y(n) = \sum_{k=-\infty}^{\infty} x(k) h_{UD}(Dn - Uk) \qquad (1)$$

Figure 2:
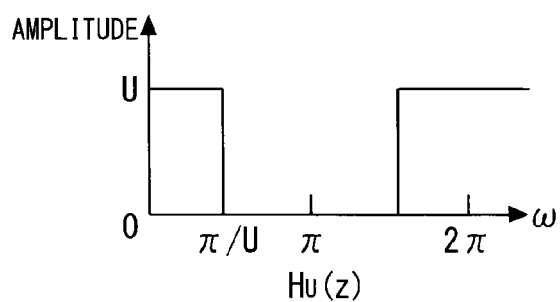
FIG. 2 shows a transfer function when an image is scaled up to U times.
Figure 3:
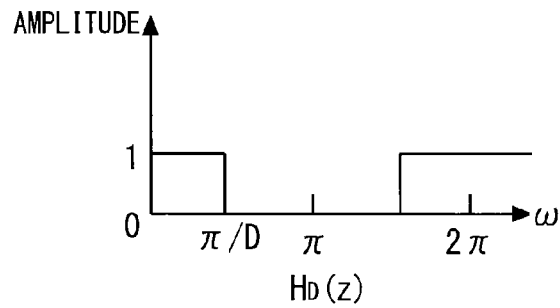
FIG. 3 shows a transfer function when an image is scaled down to 1/D times.

An ideal transfer function $H_U(z)$ of a filter impulse response $h_U(n)$ when an image is scaled up to U times is shown as in FIG. 2, which is represented on a z-axis (z=exp (jωT)), and an ideal transfer function $H_D(z)$ of a filter impulse response $h_D(n)$ when an image is scaled down to 1/D times is shown as in FIG. 3. The horizontal and vertical axes in FIGS. 2 and 3 represent normalized angular frequency (w) and amplitude, respectively.

Figure 4:
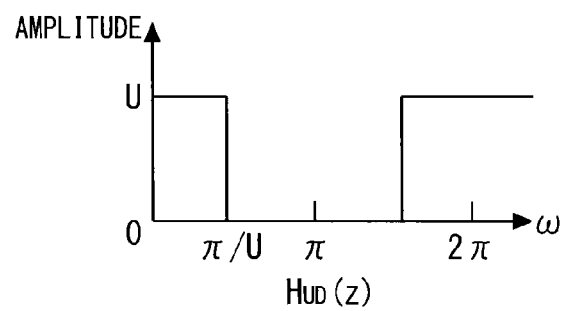
FIG. 4 shows a transfer function when an image is scaled up to U/D times.
Figure 5:
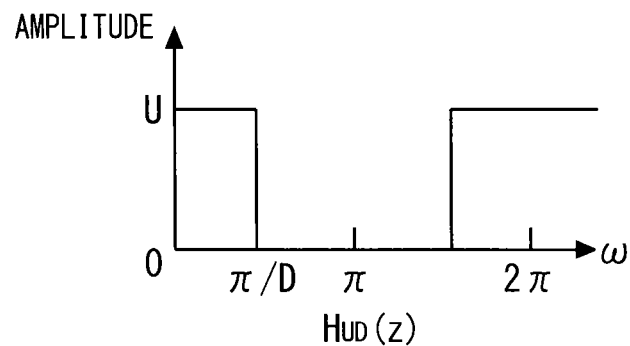
FIG. 5 shows a transfer function when an image is scaled down to U/D times.

Meanwhile, an ideal transfer function $H_{UD}(z)$ of a filter impulse response $h_{UD}(n)$ when an image is scaled up to U/D times, namely, when U>D, is shown as in FIG. 4. Also, an ideal transfer function $H_{UD}(z)$ of a filter impulse response $h_{UD}(n)$ when an image is scaled down to U/D times, namely, when U<D, is shown as in FIG. 5. The horizontal and vertical axes in FIGS. 4 and 5 represent normalized angular frequency (w) and amplitude, respectively.

When an image is scaled up to U times, shown in FIGS. 4 and 2, the transfer function $H_U(z)$ is the same and a cutoff angular frequency is π/U. This allows the filter when an image is scaled up to U times to be used as a filter when an image is scaled up to U/D times. The cutoff angular frequency of the transfer function $H_{UD}(z)$ when an image is scaled down to U/D times, shown in FIG. 5, is π/D.

The filter having the impulse response $h_{UD}(n)$ is used as the digital filter DF as described above, which does not require two filters, namely, a filter for scaling up images and a filter for scaling down images, reducing an operation amount. Besides, an image needs not to be temporarily scaled up to U times, and accordingly, a memory for storing the image data scaled up to U times is not necessary.

In the case where an image is scaled by an arbitrary multiple, a checkerboard distortion occurs at a pixel period U if filters are not properly selected.

To avoid such a checkerboard distortion, as expressed by Expression (2) below, assuming that the impulse response $h_{UD}(n)$ is a delimiter for every U pixels, a transfer function is set such that a total sum of the zeroth delimiter and total sums of the first to (U−1)th delimiters each have a constant value.

$$\sum_{k=-\infty}^{\infty} h_{UD}(-Uk) = \qquad (2)$$
$$\sum_{k=-\infty}^{\infty} h_{UD}(1-Uk) = \ldots = \sum_{k=-\infty}^{\infty} h_{UD}(U-1-Uk) = \text{constant}$$

<Example Using Interpolation Function>

The methods of scaling an image include the method using a transfer function, as well as methods involving interpolating image data using a interpolation function, such as cubic convolution, linear interpolation, cubic interpolation, Lagrange interpolation, spline interpolation, and Lanczos interpolation.

For example, Japanese Patent Application Laid-Open No. 2001-189850 describes the exemplary interpolation using cubic convolution. The interpolation using cubic convolution is described below.

$$h(t) = \begin{cases} (a+2)|t|^3 - (a+3)|t|^2 + 1, & 0 \le |t| < 1 \\ a|t|^3 - 5a|t|^2 + 8a|t| - 4a, & 1 \le |t| < 2 \\ 0, & 2 \le |t| \end{cases} \qquad (3)$$

Expression (3) above represents an interpolation function h(t) used in cubic convolution.

In Expression (3), a is a variable (−0.5 to −2) for controlling the properties of the interpolation function, and t represents the distance from each of adjacent pixels to an interpolation point.

Figure 6:
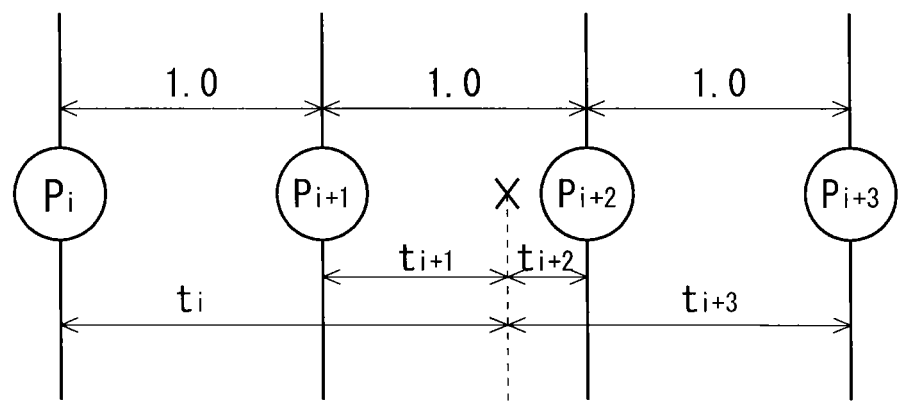
FIG. 6 is a diagram describing interpolation by cubic convolution.

FIG. 6 shows an exemplary interpolation point in cubic convolution. FIG. 6 shows the case of four pixels $P_i$, $P_{i+1}$, $P_{i+2}$, and $P_{i+3}$ linearly lined at equal intervals, where an interpolation point X is interpolated between the pixel $P_{i+1}$ and the pixel $P_{i+2}$.

The distances from the interpolation point X to the pixels Pi, $P_{i+1}$, $P_{i+2}$, and $P_{i+3}$ are represented by $t_i$, $t_{i+1}$, $t_{i+2}$, and $t_{i+3}$, respectively, and the distance between pixels is shown as 1.0. Interpolation functions $h(t_i)$, $h(t_{i+1})$, $h(t_{i+2})$, and $h(t_{i+3})$ respectively corresponding to the above-mentioned pixels are expressed by Expression (4) below.

$$\begin{cases} h(t_i) = a|t_1|^3 - 5a|t_i|^2 + 8a|t_i| - 4a \\ h(t_{i+1}) = (a+2)|t_{i+1}|^3 - (a+3)|t_{i+1}|^2 + 1 \\ h(t_{i+2}) = (a+2)|t_{i+2}|^3 - (a+3)|t_{i+2}|^2 + 1 \\ h(t_{i+3}) = a|t_{i+3}|^3 - 5a|t_{i+3}|^2 + 8a|t_{i+3}| - 4a \end{cases} \qquad (4)$$

A total sum of the results obtained by multiplying the coordinates of the pixels $P_i$, $P_{i+1}$, $P_{i+2}$, and $P_{i+3}$ by the interpolation functions $h(t_i)$, $h(t_{i+1})$, $h(t_{i+2})$, and $h(t_{i+3})$ expressed by Expression (4) above, respectively, indicates the position of the interpolation point X. The position is expressed by Expression (5) below.

$$X = P_i \times h(t_i) + P_{i+1} \times h(t_{i+1}) + P_{i+2} \times h(t_{i+2}) + P_{i+3} \times h(t_{i+3}) \qquad (5)$$

Embodiment

FIG. 7 is a block diagram showing a basic configuration of an image scaling processor 100 according to an embodiment of the present invention. Description is given below assuming that the scaling processor 100 performs U/D-times arbitrary scaling process shown in FIG. 1.

As shown in FIG. 7, the image scaling processor 100 includes a direct memory access (DMA) reader (DMAR) 5 and a DMA writer (DMAW) 6 as a data input/output section. The DMAR 5 directly reads input image data x(n) stored in a main memory 30 through a DMA bus 19. The DMAW 6 directly writes output image data y(n) into the main memory 30 through the DMA bus 19.

The input image data x(n) for one pixel read by the DMAR 5 is written into a ping-pong buffer 10 through a selector 1. The ping-pong buffer 10 includes a buffer 11 and a buffer 12 connected in parallel to each other between two outputs of the selector 1 and two inputs of a selector 2. The buffers 11 and 12 are controlled to alternately serve for writing and reading in turn. The ping-pong buffer 10 can be composed as a dual port SRAM. The dual port SRAM has two ports for inputting and outputting data. The dual port SRAM can simultaneously read data from one port and write data from the other port and operate as in the case where it has the buffers 11 and 12.

The selector 1 selects a writable buffer from the buffers 11 and 12 and writes input image data x(n) into the selected buffer. The selector 2 reads image data from the buffer, into which the input image data x(n) has been written, of the buffers 11 and 12.

Therefore, at the timing at which, for example, the input image data x(n) is written into the buffer 11, the written input image data x(n) is read from the buffer 12.

A controller 7 controls the selector 1 to select a writable buffer. The controller 7 controls the selector 2 to select a written buffer.

The input image data x(n) read from the ping-pong buffer 10 through the selector 2 is input to a multiplier 8. An interpolation coefficient is read from a coefficient table 20, which stores the impulse response $h_{UD}(n)$ of the digital filter DF (FIG. 1) as an interpolation coefficient, through the selector 3 and is then input to the multiplier 8.

Prepared as the coefficient table 20 are tables of interpolation coefficients corresponding to the scaling magnifications such as two times, three times, ½ times, and ¾ times. The controller 7 controls the selector 3 to select a table corresponding to a scaling magnification, so that an interpolation coefficient is read from the selected table.

The multiplier 8 multiplies the input image data x(n) and the interpolation coefficient $h_{UD}(n)$, and the multiplied data is provided to an adder 9. The adder 9 is provided with the added data stored in a flip-flop 13 through a selector 4 and then adds the provided data to the multiplied data provided from the multiplier 8.

The added data to which the multiplied data has been added is stored in the flip-flop 13, so that the data of the flip-flop 13 is updated. The initial value of the flip-flop 13 is zero, and for image data for an amount of one pixel, the initial value zero is first added to the multiplied data by the adder 9.

The addition by the adder 9 is the cumulative addition of the production of the $h_{UD}(Dn-Uk)$ and x(k) expressed by Expression (1). If a plurality of multipliers 8 and a plurality of adders 9 are provided, the operational parallelism is improved, increasing a processing speed.

The selector 4 provides the data stored in the flip-flop 13 to the adder 9 until the cumulative addition of Expression (1) is completed for the image data for an amount of pixels in the preset selection range. After the cumulative addition for the image data for an amount of pixels in the preset selection range is completed, the selector 4 provides the data stored in the flip-flop 13 to the shift circuit 14, so that the flip-flop 13 is initialized to zero. The controller 7 controls the selection by the selector 4.

The shift circuit 14 is composed as, for example, a shift register. The shift circuit 14 shifts the data on the accumulative operation results output from the selector 4 such that a bid count of the output image data is equal to a bit count of the input image data, and then provides the data to a clipping circuit 15. The shift circuit 14 may cause the bit count of the output image data to be equal to the bit count of the input image data, may cause the bit count of the output image data to be larger than that of an input image to increase operation accuracy, or may cause the bit count of the output image data to be smaller that of an input image to reduce operation accuracy.

The clipping circuit 15 clips, in a preset range between a minimum value and a maximum value, the data on the operation results output from the shift circuit 14, which has an adjusted bit counter, to thereby create output image data y(n). The output image data y(n) is directly written into the main memory 30 from the DMAW 6 through the DMA bus 19.

The thus obtained output image data y(n) is image data for an amount of one pixel created based on the input image data for an amount of preset pixels. The same process is performed on the pixels for an amount of preset pixels in different selection ranges, to thereby obtain the next output image data y(n).

The above-mentioned process is repeatedly performed on all pixels of one image, so that an image scaled up or down based on Expression (1) is obtained.

The scaling processor 100 shown in FIG. 7 has a configuration in which an impulse response $h_{UD}(n)$ is calculated from a transfer function and is stored in the coefficient table 20 as an interpolation coefficient. The process of converting into an integer is performed in calculation of the interpolation coefficient, so that an image can be scaled through only multiplication, addition and subtraction, and data shifting without providing a divider and a floating point unit in the scaling processor 100. The method for creating a coefficient table according to the present invention is described below.

<Method for Creating Coefficient Table>

Figure 8:
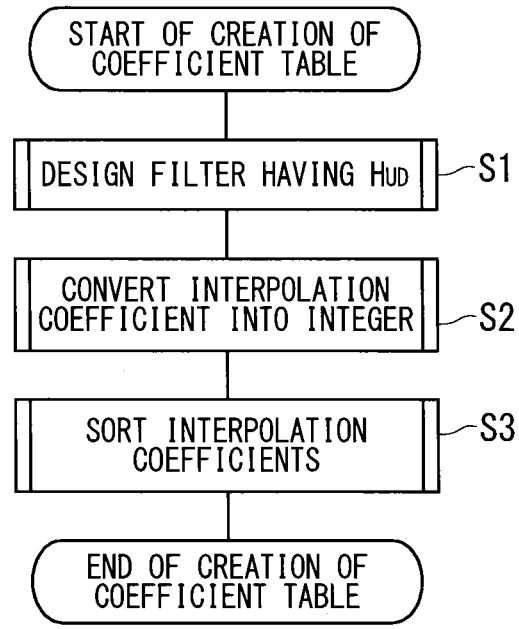
FIG. 8 is a flowchart showing a method for creating a coefficient table according to the present invention.

FIG. 8 is a flowchart showing the method for creating a coefficient table according to the present invention. In the creation of a coefficient table, first, a filter having filter characteristics of a transfer function $H_{UD}(z)$ is designed (Step S1).

Then, the interpolation coefficient of the designed filter is converted into an integer (Step S2) and, in Step S3, the interpolation coefficients are sorted such that the interpolation coefficients are rearranged for easy operation. Then, the creation of a coefficient table is ended. The details of Steps S1 to S3 above are described below.

<Design of Filter Having Transfer Function $H_{UD}(z)$>

Figure 9:
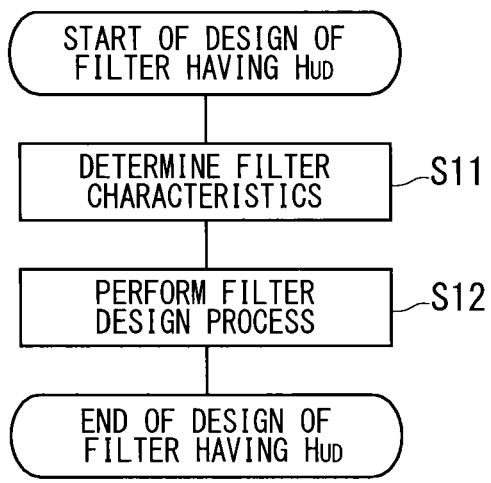
FIG. 9 is a flowchart describing designing of a filter having a transfer function $H_{UD}(z)$.

FIG. 9 is a flowchart describing the design of a filter having a transfer function $H_{UD}(z)$ in Step S1 of FIG. 8. In filter designing, first, filter characteristics are determined (Step S11). In determining filter characteristics, filter frequency characteristics, the number of taps, and filter amplitude characteristics are determined.

Then, a filter design process is performed based on the filter characteristics determined in Step S11 (Step S12).

In the filter design process, for example, the use of a numerical analysis tool such as numerical software developed by MathWorks Inc. in the United States, MATLAB, enables easy designing of filters having desired frequency characteristics and a desired number of taps, such as a least squares linear phase finite impulse response (FIR filter), a frequency-sampling-based FIR filter. An example in which MATLAB is used to design a filter is described below.

<Determination of Filter Characteristics>

First, determining filter characteristics of Step S11 is described. Description is given here assuming that filter characteristics of the transfer function $H_{UD}(z)$ corresponding to U/D times, as shown in FIGS. 4 and 5, are determined.

If the cut-off frequency is represented by fns and the amplitude at frequency 0 is represented by fls, assuming that the Nyquist frequency is one, the expression for determining fns and fls is expressed by Expression (6) below. Expression (6) shows the program written in the programming language used in MATLAB.

$$\begin{cases} if(D == 1) \\ \quad fns = 1.0/U; \\ \quad fls = U; \\ elseif(U == 1) \\ \quad fns = 1.0/D \\ \quad fls = U \\ elseif(U > D) \\ \quad fns = 1.0/U \\ \quad fls = U \\ else \\ \quad fns = 1.0/D \\ \quad fls = U \\ end \end{cases} \quad (6)$$

If the number of taps of a filter is represented by kn, the frequency characteristic vector is represented by fn, and the amplitude characteristic vector is represented by ln, kn, fn, and ln are expressed by Expression (7) below.

$$\begin{cases} kn = TAP * U \\ fn = [0, fns, fns, 1] \\ ln = [fls, fls, 0, 0] \end{cases} \quad (7)$$

In Expression (7) above, TAP represents the number of pixels being references (the number of reference points) for determining an interpolation point.

Figure 10:
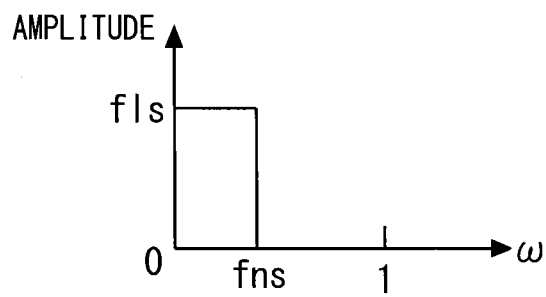
FIG. 10 shows the relationship between a frequency characteristic vector fn and an amplitude characteristic vector ln.

The relationship between the frequency characteristic vector fn and the amplitude characteristic vector ln is shown in FIG. 10.

Described here is an example of designing the filter that multiplies interpolation coefficients to obtain an interpolation point using surrounding four pixels as reference points, as in cubic convolution described with reference to FIG. 6.

In designing a 3/2-times filter where U=3 and D=2, if the surrounding four pixels are used as reference points, TAP=4. This is applied to Expression (7), so that the number of taps kn, the frequency characteristic vector fn, and the amplitude characteristic vector ln are expressed by Expression (8) below, whereby the number of taps, filter frequency characteristics, and filter amplitude characteristics can be determined.

$$\begin{cases} kn = 12 \\ fn = [0, 1/3, 1/3, 1] \\ ln = [3, 3, 0, 0] \end{cases} \quad (8)$$

<Filter Design Process>

Next, the filter design process of Step S12 is described. A filter is designed from the number of taps kn of the filter, frequency characteristic vector fn, and amplitude characteristic vector ln determined in Step S11.

For example, for an FIR filter, an impulse response is obtained. This is described using the firls function of MAT-LAB, where bn represents the vector of an impulse response.

A linear-phase FIR filter is designed with the firls function of MATLAB. This is the filter that minimizes the weighted integral square error between an ideal piecewise linear function and a filter amplitude response at a series of frequency bands.

If b=firls (n, f, a), a row vector b is output, which includes n+1 coefficients of the n-th FIR filter for approximating frequency-amplitude characteristics represented by vectors f and a. The filter coefficient to be output to b, that is, "tap" has a symmetric relationship.

Figure 11:
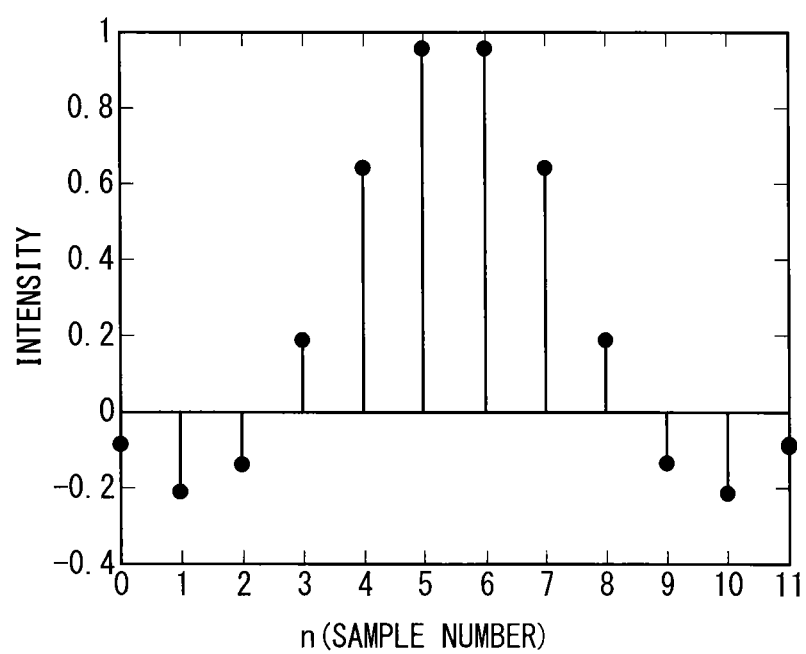
FIG. 11 shows exemplary impulse responses.

Here, bn=firls (kn−1, fn, ln). For example, for the 3/2-times filter where U=3 and D=2, the impulse response vector bn is expressed as follows, and the impulse response is shown in FIG. 11.

bn=[−0.0868, −0.2122, −0.1364, 0.1910, 0.6366, 0.9549, 0.9549, 0.6366, 0.1910, −0.1364, −0.2122, −0.0868]

<Conversion of Interpolation Coefficient into Integer>

Figure 12:
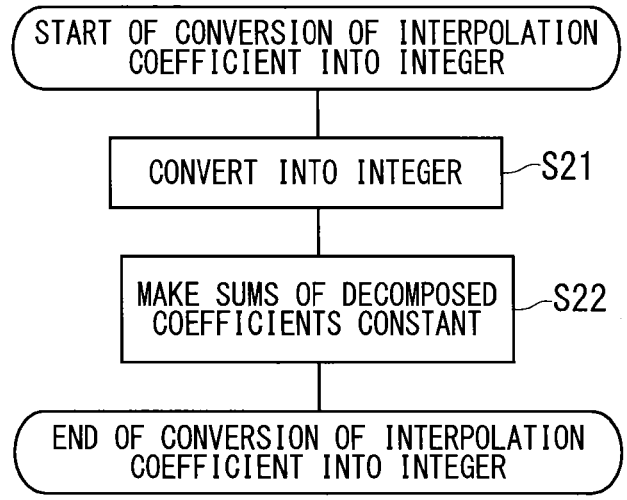
FIG. 12 is a flowchart describing conversion of interpolation coefficients to integers.

FIG. 12 is a flowchart describing converting an interpolation coefficient into an integer in Step S2 of FIG. 8. Converting an interpolation coefficient into an integer is the process for operating the number of decimal places through only multiplication, addition and subtraction, and data shifting.

As shown in FIG. 12, the process of converting into an integer is first performed (Step S21), and then, sums of coefficients decomposed into U pieces based on Expression (2) become constant (Step S22).

<Process of Converting into Integer>

In the process of converting into an integer of Step S21, first, a coefficient bn is multiplied by 2 raised to the n-th power, $2^n$ (n represents the coefficient accuracy, which is a positive integer), and is then round off, down, or up to be converted into an integer. If bn, bc, and br are vectors and round is the operational expression for rounding off, down, or up in MATLAB, bc and br are defined as follows.

$$bc = 2^n * bn$$

$$br = \text{round}(2^n * bn)$$

In other words, bc is the result obtained by multiplying the coefficient bn by $2^n$ (n is a positive integer), and br is the result obtained by rounding off, down, or up bc. A specific example thereof is described below.

<Process of Making Sums of Coefficients Constant>

In the process of making the sums of coefficients constant in Step S22, an adjustment is made in the following procedure such that the sum of coefficients decomposed into U pieces based on Expression (2) is constant.

First, the coefficient br obtained by rounding off the result bc, which has been obtained by multiplying the coefficient bn by $2^n$, is decomposed into U pieces as expressed in Expression (2), and then, the sums of the decomposed coefficients are individually determined. This process is expressed by Expression (9).

$$\sum_{k=-\infty}^{\infty} br(-Uk), \qquad (9)$$

$$\sum_{k=-\infty}^{\infty} br(1-Uk), \ldots ,$$

$$\sum_{k=-\infty}^{\infty} br(U-1-Uk)$$

Then, the difference between each sum of the decomposed coefficients and $2^n$ is obtained. This process is expressed by Expression (10) below.

$$2^n - \sum_{k=-\infty}^{\infty} br(-Uk), \qquad (10)$$

$$2^n - \sum_{k=-\infty}^{\infty} br(1-Uk), \ldots ,$$

$$2^n - \sum_{k=-\infty}^{\infty} br(U-1-Uk)$$

Then, the difference between the coefficient bc obtained by multiplying bn by $2^n$ and the coefficient br is obtained for each set processed as described above. This process is expressed by Expression (11) below.

$$\begin{cases} br(-Uk) - bc(-Uk) \\ br(1-Uk) - bc(1-Uk) \\ \vdots \\ br(U-1-Uk) - bc(U-1-Uk) \end{cases} \qquad (11)$$

It is checked whether each sum of coefficients in Expression (10) is larger than $2^n$, that is, whether or not the relation of Expression (12) below is satisfied.

$$2^n < \sum_{k=-\infty}^{\infty} br(-Uk), \qquad (12)$$

$$2^n < \sum_{k=-\infty}^{\infty} br(1-Uk), \ldots ,$$

$$2^n < \sum_{k=-\infty}^{\infty} br(U-1-Uk)$$

If the relation of Expression (12) is satisfied, in the sequence from the coefficient set having the largest difference between the coefficient br and the coefficient bc, which is expressed by Expression (11), one is subtracted from each of the coefficients br until the sum of the coefficients br is equal to $2^n$.

It is checked whether each sum of coefficients in Expression (10) is smaller than $2^n$, that is, whether or not the relation of Expression (13) below is satisfied.

$$2^n > \sum_{k=-\infty}^{\infty} br(-Uk), \qquad (13)$$

$$2^n > \sum_{k=-\infty}^{\infty} br(1-Uk), \ldots ,$$

-continued $$2^n > \sum_{k=-\infty}^{\infty} br(U-1-Uk)$$

If the relation of Expression (13) is satisfied, in the sequence from the coefficient set having the largest difference between the coefficient br and the coefficient bc, which is expressed by Expression (11), one is added to each of the coefficients br until the sum of the coefficients br is equal to $2^n$.

Now, converting a coefficient into an integer is described with a specific example. In designing a 3/2-times filter where U=3 and D=2, if the accuracy of coefficient data is 10 bits, n=10, and $2^{10}$=1024. Then, the vector corresponding to FIG. 11 is used for the vector bn of an impulse response, whereby the following coefficients bc are obtained.

$bc=2^{10}*bn=[-88.8953,-217.2995,-139.6926,$
$\qquad 195.5696,651.8986,977.8480,977.8480,651.8986,195.5696,$
$\qquad -139.6926,-217.2995,-88.8953]$ The coefficients bc are expressed as follows when being decomposed into three in accordance with the number of magnification (U).

$bc(-3k)=[-139.6926,977.8480,195.5696,-88.8953]$ $bc(1-3k)=[-217.2995,651.8986,651.8986,-217.2995]$ $bc(2-3k)=[-88.8953,195.5696,977.8480,-139.6926]$

When the round operation is applied to bc as the rounding-off operation, the following coefficients br are obtained.

$br=\text{round}(2^{10}*bn)=[-89,-217,-140,196,652,978,978,$
$\qquad 652,196,-140,-217,-89]$ The differences between the coefficients bc and the coefficients, expressed by Expression (11), are as follows.

$br-bc=[-0.1047,0.2995,-0.3074,0.4304,0.1014,$
$\qquad 0.1520,0.1520,0.1014,0.4304,-0.3074,0.2995,-$
$\qquad 0.1047]$ The coefficients br are expressed as follows when being decomposed into three in accordance with the number of magnification (U).

$br(-3k)=[-140,978,196,-89]$ $br(1-3k)=[-217,652,652,-217]$ $br(2-3k)=[-89,196,978,-140]$

The total sums of the coefficients br are expressed by Expression (14) below.

$$\begin{cases} \sum_{k=-\infty}^{\infty} br(-3k) = -140 + 978 + 196 + (-89) = 945 \\ \sum_{k=-\infty}^{\infty} br(1-3k) = -217 + 652 + 652 + (-217) = 870 \\ \sum_{k=-\infty}^{\infty} br(2-3k) = -89 + 196 + 978 + (-140) = 945 \end{cases} \quad (14)$$

Expression (14) above shows that the zeroth total sum is 945, the first total sum is 870, and the second total sum is 945 and they are each smaller than $2^{10}$ (=1024), and accordingly, one is added to each of br(−3k), br(1−3k), and br(2−3k) up to 1024. The addition is performed in the sequence from the smallest difference value obtained by br−bc.

In other words, br(−3k)−bc(−3k)=[−0.3074, 0.1520, 0.4304, −0.1047], and accordingly, for the coefficient br(−3k), addition is performed in the sequence of the first component, the fourth component, the second component, and the third component.

That is, br(−3k)=[−140, 978, 196, −89], and thus, one is added 79 times until the total sum of br(−3k) is equal to 1024 in the sequence from the first component, the fourth component, the second component, and the third component.

Similarly, br(1−3k)−bc(1−3k)=[0.2995, 0.1014, 0.1014, 0.2995], and accordingly, for the coefficient br(1−3k), addition is performed in the sequence of the second component, the third component, the first component, and the fourth component.

In other words, br(1−3k)=[−217, 652, 652, (−217)], and accordingly, one is added 154 times until the total sum of br(1−3k) is equal to 1024 in the sequence of the second component, the third component, the first component, and the fourth component.

Also, br(2−3k)−bc(2−3k)=[−0.1047, 0.4304, 0.1520, −0.3074], and accordingly, addition is performed in the sequence of the fourth component, the first component, the third component, and the second component.

In other words, br(2−3k)=[−89, 196, 978, (−140)], and accordingly, one is added 79 times until the total sum of br(1−3k) is equal to 1024.

The results of the addition to the coefficients br(−3k), br(1−3k), and br(2−3k) are represented as coefficients br(−3k)', br(1−3k)', and br(2−3k)', respectively, which are expressed as follows.

$br(-3k)'=[-120,978,196,-89]$ $br(1-3k)'=[-179,691,691,-179]$ $br(2-3k)'=[-69,215,998,-120]$

Therefore, the impulse responses of the transfer function $H_{UD}(z)$ are as follows: $h_{UD}$=[−69, −179, −120, 215, 691, 998, 998, 691, 215, −120, −179, −69].

<Sort of Interpolation Coefficients>

The process of sorting interpolation coefficients is the process of rearranging impulse responses $h_{UD}$ of the transfer function $H_{UD}(z)$ in accordance with the convolution operation of Expression (1) and then storing the rearranged impulse responses $h_{UD}$ in the coefficient table 20 (FIG. 7).

In this case, to prevent the position of the image to be output from displacing from the input image, the impulse responses $h_{UD}$ are sorted such that a zero-phase filter is created.

Figure 13:
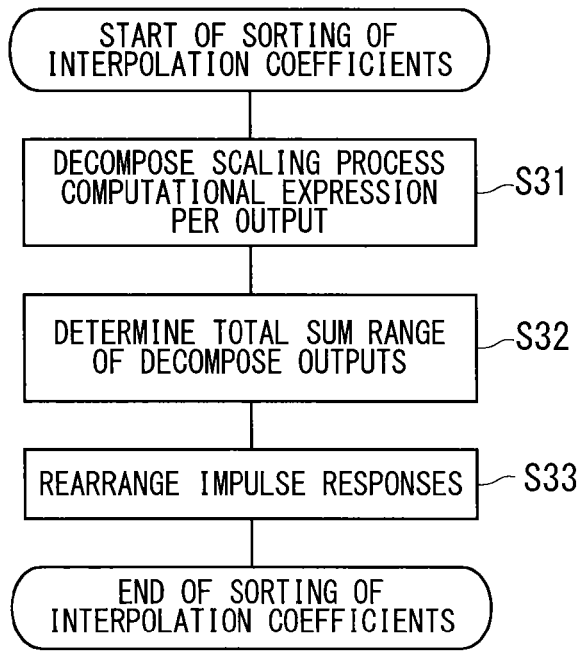
FIG. 13 is a flowchart describing a process of sorting interpolation coefficients.

FIG. 13 is a flowchart describing the process of sorting interpolation coefficients in Step S3 of FIG. 8.

<Decomposition of Scaling Process Operational Expression Per Output>

As shown in Step S31, first, the scaling process operational expression, expressed by Expression (1), is decomposed per output. This process is expressed by Expression (15) below.

$$\begin{cases} y(Um) = \sum_k x(k)h_{UD}(DUm - Uk) \\ y(Um+1) = \sum_k x(k)h_{UD}(D(Um+1) - Uk) \\ \vdots \\ y(Um+U-1) = \sum_k x(k)h_{UD}(D(Um+U-1) - Uk) \end{cases} \quad (15)$$

In Expression (15) above, m and k are integers, and the value of k is adjusted to perform operation with the impulse response $h_{UD}$.

Now, the output of the scaling process operational expression is described with a specific example. When a 3/2-times filter is designed where U=3 and D=2, Expression (15) is represented as Expression (16) below.

$$\begin{cases} y(3m) = \sum_k x(k)h_{UD}(6m - 3k) \\ y(3m+1) = \sum_k x(k)h_{UD}(6m + 2 - 3k) \\ y(3m+2) = \sum_k x(k)h_{UD}(6m + 4 - 3k) \\ y(3m+3) = \sum_k x(k)h_{UD}(6m + 6 - 3k) \end{cases} \quad (16)$$

Now, to take an example of the impulse response $h_{UD}$ of the transfer function $H_{UD}(z)$m, which has been converted into an integer, in the 3/2-times filter described above, $h_{UD}$ falls within the range of −6 to 5, and is represented as follows: $h_{UD}(-6, 5)=[-69, -179, -120, 215, 691, 998, 998, 691, 215, -120, -179, -69]$.

<Determination of Total Sum Range>

As shown in Step S32 of FIG. 13, next, a range is determined from which the total sums of outputs expressed by Expression (16) are calculated.

If m=0 and $h_{UD}$ takes a value within the range of −6 to 5 in Expression (16) above, Expression (16) is represented as Expression (17).

$$\begin{cases} y(0) = \sum_{k=-1}^{2} x(k)h_{UD}(-3k) \\ y(1) = \sum_{k=-1}^{2} x(k)h_{UD}(2 - 3k) \\ y(2) = \sum_{k=0}^{3} x(k)h_{UD}(1 - 3(k-1)) \\ y(3) = \sum_{k=1}^{4} x(k)h_{UD}(6 - 3k) \end{cases} \quad (17)$$

In Expression (17) above, for y(0) and y(1), the range (the range between a minimum value and a maximum values of k) in which the total sum (E) is calculated is −1 to 2. The range is 0 to 3 for y(2) and 1 to 4 for y(3). The method for determining the range between a minimum value and a maximum value of k is described below.

<Sort of Coefficients>

After the range between the minimum value and the maximum value of k is determined, as shown in Step S33 of FIG. 13, the impulse responses $h_{UD}$ of the transfer function $H_{UD}(z)$ are rearranged.

The calculation results of y(0) in Expression (17) above can be shown as in FIG. 14. FIG. 14 schematically shows an operation of creating (interpolating) output image data y(0) to serve as an interpolation point based on pieces of pixel data x(−1), x(0), x(1), x(2) of an input image, where the pieces of pixel data x(−1), x(0), x(1), and x(2) are multiplied by interpolation coefficients −120, 998, 215, and −69, respectively. The interpolation coefficients −120, 998, 215, and −69 correspond to the coefficient br(−3k)' described above.

The pixel data x(−1) is the pixel data in the leftmost region free from a pixel in an image, pixel data being generated by symmetric expansion in which an image is folded back to be used.

The calculation results of y(1) in Expression (17) can be shown as in FIG. 15. FIG. 15 schematically shows an operation of interpolating the output image data y(1) to serve as an interpolation point based on pieces of pixel data x(−1), x(0), x(1), and x(2) of an input image, where the pieces of pixel data x(−1), x(0), x(1), and x(2) are multiplied by interpolation coefficients −69, 215, 998, and −120, respectively. The interpolation coefficients −69, 215, 998, and −120 correspond to the coefficient br(2−3k)' described above.

The calculation results of y(2) in Expression (17) can be shown as in FIG. 16. FIG. 16 schematically shows an operation of shifting (skipping) the selection range of pixel data rightward by one pixel and interpolating the output image data y(1) to serve as an interpolation point based on pieces of pixel data x(0), x(1), x(2), and x(3) of an input image, where the pieces of pixel data x(0), x(1), x(2), and x(3) are multiplied by interpolation coefficients −179, 691, 691, and −179, respectively. The interpolation coefficients −179, 691, 691, and −179 correspond to the coefficient br(1−3k)' described above.

The calculation results of y(3) in Expression (17) can be shown as in FIG. 17. FIG. 17 schematically shows an operation of skipping the selection rage of pixel data rightward by one pixel and interpolating the output image data y(3) to serve as an interpolation point based on pieces of pixel data x(1), x(2), x(3), and x(4) of an input image, where the pieces of pixel data x(1), x(2), x(3), and x(4) are multiplied by interpolation coefficients −120, 998, 215, and −69, respectively. The interpolation coefficients −120, 998, 215, and −69 correspond to the coefficient br(−3k)' described above. In the calculation of y(4), the selection range of the pixel data is not skipped and the pieces of pixel data x(1), x(2), x(3), and x(4) are multiplied by the coefficient br(2−3k)'.

As described above, the selection range of the pixel data of input image, which serves as an interpolation target, is skipped rightward by one pixel from the left end of the image, or the selection range is not skipped, and the coefficients br(−3k)', br(1−3k)', and br(2−3k)' are repeatedly added up, so that the output image data is interpolated.

The coefficient table 20 (FIG. 7) stores, as a table, data on the coefficients br(−3k)', br(1−3k)', and br(2−3k)', the repetition sequence of the operations of multiplying those coefficients, and the number of skips of pixel data.

FIG. 18 shows an exemplary coefficient table corresponding to the calculation results of Expression (17) described with reference to FIGS. 14 to 16.

FIG. 18 shows the repetition sequence of the operations on the coefficients br(−3k)', br(2−3k)', and br(1−3k)' as the zeroth, first, and second, and shows the numbers of skips corresponding to the above-mentioned coefficients as one time, zero time, and one time, respectively.

The coefficient table is defined by rearranging the impulse responses of the transfer function $H_{UD}(z)$ that are expressed as, for example, $h_{UD}(-6,5)=[-69, -179, -120, 215, 691, 998, 998, 691, 215, -120, -179, -69]$ into the array as shown in FIG. 18, and then, the process of sorting interpolation coefficients is complete.

The number of the operation repetition sequence is defined by the number of magnification (U), and the number of interpolation coefficients is defined by the number of pixels to serve as references (the number of references) for determining an interpolation point, represented as TAP in Expression (7). If four pixels are reference points, TAP=4, so that the number of interpolation coefficients is four.

As described above, the number of skips in the selection range of the pixel data of an input image is predetermined and is stored in the coefficient table 20, and the number of skips is determined when a variable is determined in Expression (15), which is described below.

The controller (FIG. 7) controls reading of interpolation coefficients and skipping of the selection range of pixel data. In this control, the number of skips is ignored for the first operation of y(0) (zeroth operation), and the selection range is set so as to include the leftmost pixel data of an image without being skipped. After that, the operation is repeated in the sequence of the first, second, and zeroth, so that an interpolation is performed on all pieces of pixel data of one image.

The output y(n), obtained through multiplication by an interpolation coefficient and cumulative addition (total sum) of the pieces of multiplied data, is output through the selector 4 (FIG. 7). The output y(n) is supplied from the selector 4 to the shift circuit 14 (FIG. 7) and is shifted by the amount of the bit count (here, 10 bits) corresponding to n of 2 raised to the n-th power, $2^n$, of two used in converting a coefficient into an integer, thereby being supplied to the clipping circuit 15. This is the process of shifting 20 bits of data, obtained by multiplying 10 bits of pixel data by a 10-bit coefficient, rightward by 10 bits and dividing the data by 10 bits to return the data to 10 bits of data.

The clipping circuit 15 clips, in the predetermined range between a minimum value and a maximum value, the data on the calculation results output from the shift circuit 14 as output image data y(n).

<Generalization of Process of Sorting Interpolation Coefficients>

Although the process of sorting interpolation coefficients has been described for only the case in which a 3/2-times filter is designed, description is given below for a general case in which a U/D-times filter is designed.

In designing a U/D-times filter, if the method for individually multiplying TAP pixels $P_i$, $P_{i+1}$, . . . , $P_{i+TAP-1}$, which serve as references for determining an interpolation point, by an interpolation coefficient to determine an interpolation point is employed as described above, the number of interpolation coefficients of the impulse response $H_{UD}$ is U×TAP, and the impulse response $h_{UD}$ of the transfer function $H_{UD}(z)$ is expressed by Expression (18) below.

$$h_{UD}(-\lfloor U \times \text{TAP}/2 \rfloor, \lfloor U \times \text{TAP}/2 \rfloor -1) \quad (18)$$

In Expression (18) above, the symbol surrounding "U×TAP/2" represents a floor function, which is a function for associating a real number with a smaller integer. For example, −2.5 is a floor function −3, and 2.5 is a floor function 2.

The impulse response $h_{UD}$ is converted into an integer and is processed to have a constant sum of decomposed coefficients as described above, and is consequently supplied as a vector br'.

Expression (15), in which the scaling process operational expression expressed by Expression (1) is decomposed per output, is transformed as shown in Expression (19), to thereby obtain the range for obtaining a total sum, namely, $\text{MAX}_{Um}$ to $\text{MAX}_{Um+U-1}$ and $\text{MIN}_{Um}$ to $\text{MIN}_{Um+U-1}$.

$$\begin{cases} y(Um) = \sum_{k=MIN_{Um}}^{MAX_{Um}} x(k) h_{UD}(DUm - Uk) \\ y(Um+1) = \sum_{k=MIN_{Um+1}}^{MAX_{Um+1}} x(k) h_{UD}(D(Um+1) - Uk) \\ \vdots \\ y(Um+U-1) = \sum_{k=MIN_{Um+U-1}}^{MAX_{Um+U-1}} x(k) h_{UD}(D(Um+U-1) - Uk) \end{cases} \quad (19)$$

If any one of $\text{MAX}_{Um}$ to $\text{MAX}_{Um+u-1}$ and $\text{MIN}_{Um}$ to $\text{MIN}_{Um+u-1}$ is determined, the others are determined. Thus, the case in which $\text{MAX}_{Um}$ is obtained first is described as an example.

DUm−Uk of the right side of y(Um) in Expression (19) is represented by an initial value Init, which is transformed as shown in Expression (20) below to determine a coefficient k as $\text{MAX}_{Um}$.

$$k = \frac{-Init + DUm}{U} = \text{MAX}_{Um} \quad (20)$$

The initial value Init falls within the range of Expression (21) below.

$$-\lfloor U \times \text{TAP}/2 \rfloor \leq \text{Init} \leq -\lfloor U \times \text{TAP}/2 \rfloor + D - 1 \quad (21)$$

Here, k obtained by Expression (20) is k used for y(Um) in Expression (19).

When $\text{MAX}_{Um}$ is determined, $\text{MIN}_{Um}$ is determined as Expression (22) below.

$$\text{MIN}_{Um} = \text{MAX}_{Um} - \text{TAP} + 1 \quad (22)$$

Next, $\text{MAX}_{Um+1}$ is determined. The initial value Init is defined as in Expression (23) from Expression (21).

$$\text{Init} = -\lfloor U \times \text{TAP}/2 \rfloor \quad (23)$$

Then, D(Um+1)−Uk of the right side of y(Um+1) in Expression (19) is defined as in Expression (24) below. In Expression (24) below, "%" is a modulus operator.

$$D(Um+1) - Uk = -\lfloor U \times \text{TAP}/2 \rfloor + D \,\%\, U \quad (24)$$

Expression (24) above is transformed into Expression (25) to obtain k as $\text{MAX}_{Um+1}$.

Here, k obtained by Expression (24) is k used in y(Um+1) in Expression (19).

$$k = \frac{\lfloor U \times \text{TAP}/2 \rfloor - D \,\%\, U + D(Um+1)}{U} = \text{MAX}_{Um+1} \quad (25)$$

After $\text{MAX}_{Um+1}$ is determined, $\text{MIN}_{Um+1}$ is determined as in Expression (26) below.

$$\text{MIN}_{Um+1} = \text{MAX}_{Um+1} - \text{TAP} + 1 \quad (26)$$

Then, $\text{MAX}_{Um+U-1}$ is determined. First, D(Um+U−1)−Uk of the right side of y(Um+U−1) in Expression (19) is defined as in Expression (27).

$$D(Um+U-1) - Uk = -\lfloor U \times \text{TAP}/2 \rfloor + D(U-1) \,\%\, U \quad (27)$$

Expression (27) above is transformed into Expression (28) below to obtain k as $\text{MAX}_{Um+U-1}$.

$$k = \frac{\lfloor U \times \text{TAP}/2 \rfloor - D(U-1) \,\%\, U + D(Um+U-1)}{U} = \text{MAX}_{Um+U-1} \quad (28)$$

Here, k obtained by Expression (28) above is k used in y(Um+U−1) in Expression (19).

When $MAX_{Um+U-1}$ is determined, $MIN_{Um+U-1}$ is determined as in Expression (29) below.

$$MIN_{Um+U-1} = MAX_{Um+U-1} - TAP + 1 \quad (29)$$

Then, to obtain $MAX_{Um}$ to $MAX_{Um+U-1}$ and $MIN_{Um}$ to $MIN_{Um+U-1}$, Expressions (20), (22), (25), (26), (28), and (29) are generalized by $MAX_{Um+n}$ and $MIN_{Um+n}$ where n=0, ..., U-1, so that they are expressed as Expression (30) below.

$$\begin{cases} MAX_{Um+n} = \dfrac{\lfloor U \times TAP/2 \rfloor - Dn \% U + D(Um+n)}{U} \\ Min_{Um+n} = MAX_{Um+n} - TAP + 1 \end{cases} \quad (30)$$

Then, as an example, Expression (31) below shows the results of $MAX_0, MAX_1, MAX_2, MAX_3, \ldots, MIN_0, MIN_1, MIN_2, MIN_3, \ldots$ obtained from Expression (30) where m=0, 1, n=0, 1, 2, and TAP=4 in the case where a 3/2-times filter is designed where U=3 and D=2.

$$\begin{cases} MAX_0 = 2 \\ MIN_0 = -1 \\ MAX_1 = 2 \\ MIN_1 = -1 \\ MAX_2 = 3 \\ MIN_2 = 0 \\ MAX_3 = 4 \\ MIN_3 = 1 \\ \vdots \end{cases} \quad (31)$$

Expression (17) described above is obtained by applying Expression (31) to Expression (19).

As described above, in the case where a filter that multiplies TAP pixels by a coefficient to obtain an interpolation point is designed as a U/D-times filter, Expression (19) generalized can be used to determine a range whose total sum is obtained from Expression (30). This corresponds to Step S32 of the flowchart shown in FIG. 13.

Next, description is given of the method for determining the number of skips based on Expression (15) described above.

The impulse responses $h_{UD}$ of the right side of the first equation to the final equation (U-th equation) of Expression (19) obtained by transforming Expression (15) represent coefficient strings 0 to U-1 as shown in Expression (32) below, respectively.

$$\begin{cases} \text{Coefficient string } 0 & h_{UD}(DUm - Uk) & k = MIN_o, \ldots, MAX_0 \\ \text{Coefficient string } 1 & h_{UD}(D(Um+1)Uk) & k = MIN_1, \ldots, MAX_1 \\ \vdots \\ \text{Coefficient string } U-1 & h_{UD}(D(Um+U-1)-Uk) & k = MIN_{U-1}, \ldots, MAX_{U-1} \end{cases} \quad (32)$$

The coefficient string 0 is a coefficient string when k ranges from $MIN_0$ to $MAX_0$ in $h_{UD}(DUm-Uk)$, the coefficient string 1 is a coefficient string when k ranges from $MIN_1$ to $MAX_1$ in $h_{UD}(D(Um+1)-Uk)$, and the coefficient string U-1 is a coefficient string when k ranges from $MIN_{U-1}$ to $MAX_{U-1}$ in $h_{UD}(D(Um+U-1)-Uk)$.

The number of skips is defined by how many pixels the input range of the output pixel y(n) is skipped with respect to the input range of the last output pixel y(n-1), which is expressed by Expression (33) below.

$$\begin{cases} \text{Number of skips of coefficient string } 0 & skip_0 = MAX_o - MAX_{-1} \\ \text{Number of skips of coefficient string } 1 & skip_1 = MAX_1 - MAX_0 \\ \vdots \\ \text{Number of skips of coefficient string } U-1 & skip_{U-1} = MAX_{U-1} - MAX_{U-2} \end{cases} \quad (33)$$

Expression (33) above can be generalized by Expression (34) below as the expression for the number of skips $skip_n$ of the coefficient string n based on Expression (30).

$$\begin{cases} \text{Number of skips of coefficient string } n \\ skip_n = MAX_{Um+n} - MAX_{Um+n-1} = \dfrac{-((Dn)\% U) + (D(n-1)\% U) + D}{U} \end{cases} \quad (34)$$

In Expression (34) above, the number of skips is obtained where, for example, m=0, U=3, D=2, and n=0 to 2. As a result, skip0=1, skip1=0, and skip2=1, matching the coefficient table of FIG. 18.

<Creation of Coefficient Table Using Interpolation Function>

As described above, a coefficient table can be created also in the case where an interpolation function is used for image scaling.

For example, Expression (4) describing the interpolation using cubic convolution is transformed into Expression (35) below such that the interpolation is achieved through only integer multiplication, integer addition and subtraction, and data shifting.

$$\begin{cases} h(t_i)' = \text{round}(h(t_i) * 2^n) \\ h(t_{i+1})' = \text{round}(h(t_{i+1}) * 2^n) \\ h(t_{i+2})' = \text{round}(h(t_{i+2}) * 2^n) \\ h(t_{i+3})' = 2^n - (h(t_i)' + h(t_{i+1})' + h(t_{i+2})') \end{cases} \quad (35)$$

In Expression (35), a value obtained by multiplying the interpolation function $h(t_i)$ by $2^n$ and then rounding the resultant value is $h(t_i)'$, a value obtained by multiplying the interpolation function $h(t_{i+1})$ by $2^n$ and then rounding the resultant value is $h(t_{i+1})'$, a value obtained by multiplying the interpolation function $h(t_{i+2})$ by $2^n$ and then rounding the resultant value is $h(t_{i+2})'$, and a value obtained by subtracting $h(t_i)'$, $h(t_{i+1})'$, and $h(t_{i+2})'$ from $2^n$ is $h(t_{i+3})'$.

If the interpolation point X shown in FIG. 6 is an output y(0), the coordination thereof is $b_0$, and the coordinate of output y(j) is $b_j$, the relationship between the coordinate $b_j$ and the coordinate $b_0$ is expressed as the first equation of Expression (36) below, and $t_i$, $t_{i+1}$, $t_{i+2}$, and $t_{i+3}$ are expressed as the second to fifth equations of Expression (36) below.

$$\begin{cases} b_j = b_0 + (D/U) \times j \\ t_i = t_{i+1} + 1.0 \\ t_{i+1} = b_{j+1} - \text{INT}(b_j) \\ t_{i+2} = 1.0 - t_{i+1} \\ t_{i+3} = t_{i+2} + 1.0 \end{cases} \quad (36)$$

Here, $\text{INT}(b_j)$ of the third equation of Expression (36) represents the operation of dropping the fractional portion of the number from the coordinate $b_j$, and the value of the coordinate $b_j$ is defined by a value carried from the integer portion of the last coordinate $b_{j-1}$.

Then, $h(t_i)'$, $h(t_{i+2})'$, and $h(t_{i+3})'$ are obtained based on Expressions (4), (35), and (36), to thereby create a coefficient table.

In an exemplary case in which a 3/2-times filter where U=3 and D=2 is designed, if the coordinate $b_0=1/6$, n=10, and a=1.2, a coefficient table to be obtained is as shown in FIG. 19.

The interpolation coefficients stored in the coefficient table and pieces of corresponding image data are individually multiplied as expressed by Expression (5), and the multiplication results are added together, to thereby obtain an interpolation point.

A coefficient table can be created also in a case where an interpolation function is used for image scaling.

<Modifications>

In the description above, as expressed by Expression (35), $h(t_i)'$, $h(t_{i+1})'$, and $h(t_{i+2})'$ are individually obtained, and then, a value obtained by subtracting $h(t_i)'$, and $h(t_{i+2})'$ from $2^n$ is taken as $h(t_{i+3})'$, which is not limited thereto.

For example, as expressed by Expression (37) below, $h(t_{i+1})'$, $h(t_{i+2})'$, and $h(t_{i+3})'$ may be individually obtained, and then, $h(t_{i+1})'$, $h(t_{i+2})'$, and $h(t_{i+3})'$ may be subtracted from $2^n$, to thereby obtain $h(t_i)'$.

$$\begin{cases} h(t_i)' = 2^n - (h(t_{i+1})' + h(t_{i+2}) + h(t_{i+3})') \\ h(t_{i+1})' = \text{round}(h(t_{i+1}) * 2^n) \\ h(t_{i+2})' = \text{round}(h(t_{i+2}) * 2^n) \\ h(t_{i+3})' = \text{round}(h(t_{i+3}) * 2^n) \end{cases} \quad (37)$$

Alternatively, as expressed by Expression (38) below, $h(t_i)'$, $h(t_{i+2})'$, and $h(t_{i+3})'$ may be individually obtained, and then, $h(t_i)'$, $h(t_{i+2})'$, and $h(t_{i+3})'$ may be subtracted from $2^n$, to thereby obtain $h(t_{i+1})'$.

$$\begin{cases} h(t_i)' = \text{round}(h(t_i) * 2^n) \\ h(t_{i+1})' = 2^n - (h(t_i)' + h(t_{i+2})' + h(t_{i+3})') \\ h(t_{i+2})' = \text{round}(h(t_{i+2}) * 2^n) \\ h(t_{i+3})' = \text{round}(h(t_{i+3}) * 2^n) \end{cases} \quad (38)$$

Still alternatively, as expressed by Expression (39) below, $h(t_i)'$, $h(t_{i+1})'$, and $h(t_{i+3})'$ may be individually obtained, and then, $h(t_i)'$, $h(t_{i+1})'$, and $h(t_{i+3})'$ may be subtracted from $2^n$, to thereby obtain $h(t_{i+2})'$.

$$\begin{cases} h(t_i)' = \text{round}(h(t_i) * 2^n) \\ h(t_{i+1})' = \text{round}(h(t_{i+1}) * 2^n) \\ h(t_{i+2})' = 2^n - (h(t_i)' + h(t_{i+2})' + h(t_{i+3})') \\ h(t_{i+3})' = \text{round}(h(t_{i+3}) * 2^n) \end{cases} \quad (39)$$

Although the description has been given of the case in which an image is scaled up, the present invention may also be applicable to the case in which an image is scaled down.

What is claimed is:

1. A method for creating a coefficient table storing interpolation coefficients to be used in an image scaling process of converting input image data to U/D times (U and D are natural numbers) as output image data, the method comprising the steps of:
   (a) designing a filter having a transfer function for simultaneously performing conversions into U times and 1/D times;
   (b) converting interpolation coefficients defined by an impulse response of said filter into integers to calculate integer-converted interpolation coefficients; and
   (c) sorting said integer-converted interpolation coefficients in a sequence to be used in said process of converting input image data to U/D times and storing said integer-converted interpolation coefficients in said coefficient table, wherein said step (b) includes the steps of:
   (b-1) multiplying each of said interpolation coefficients by 2 raised by a predetermined number, and rounding off, rounding down, or rounding up said interpolation coefficient to convert said interpolation coefficient into an integer; and
   (b-2) partitioning said integer-converted interpolation coefficients for every pixels equal to a predetermined number of pixels among a plurality of pieces of pixel data constituting said input image data, and adding or subtracting one to and from each of said integer-converted interpolation coefficients partitioned such that a total sum of said integer-converted interpolation coefficients partitioned is equal to 2 raised by said predetermined number, and said step (c) includes the steps of:
   (c-1) partitioning said integer-converted interpolation coefficients such that said plurality of pieces of pixel data are individually multiplied by said integer-converted interpolation coefficients for every said predetermined number of pixels;
   (c-2) storing said integer-converted interpolation coefficients partitioned in said coefficient table in a predetermined sequence such that in said predetermined sequence, said plurality of pieces of pixel data are repeatedly multiplied by said integer-converted interpolation coefficients partitioned; and
   (c-3) associating the number of skips with said integer-converted interpolation coefficients partitioned to store said number of skips in said coefficient table, said number of skips defining whether to skip said integer-converted interpolation coefficients partitioned for a predetermined number of pixels and multiply said plurality of pieces of pixel data by said integer-converted interpolation coefficients partitioned or to multiply said plurality of pieces of pixel data by said integer-converted interpolation coefficients partitioned without skip.

2. The method for creating a coefficient table according to claim 1, wherein in said step (c-2), said integer-converted interpolation coefficients partitioned are repeatedly multiplied in said predetermined sequence in cycles corresponding to said U-times.

3. The method for creating a coefficient table according to claim 1, wherein in said step (b-1), said predetermined number by which 2 is raised is defined by a bit count of said pixel data.

4. A method for creating a coefficient table storing interpolation coefficients to be used in an image scaling process of converting input image data to U/D times (U and D are natural numbers) as output image data, the method comprising the steps of:
   (a) designing a filter by an interpolation function for conversion to U/D times;
   (b) converting interpolation coefficients defined by said interpolation function into integers to calculate integer-converted interpolation coefficients; and
   (c) sorting said integer-converted interpolation coefficients in a sequence to be used in said process of converting input image data to U/D times and storing said integer-converted interpolation coefficients in said coefficient table, wherein
   said step (b) includes the steps of:
   (b-1) multiplying each of said interpolation coefficients by 2 raised by a predetermined number, and rounding off, rounding down, or rounding up said interpolation coefficient to convert said interpolation coefficient into an integer, and subtracting each of said integer-converted interpolation coefficients from 2 raised by said predetermined number to convert said interpolation coefficient into an integer; and
   (b-2) partitioning said integer-converted interpolation coefficients for every pixels equal to a predetermined number of pixels among a plurality of pieces of pixel data constituting said input image data, and adding or subtracting one to and from each of said integer-converted interpolation coefficients partitioned such that a total sum of said integer-converted interpolation coefficients partitioned is equal to 2 raised by said predetermined number, and
   said step (c) includes the steps of:
   (c-1) partitioning said integer-converted interpolation coefficients such that said plurality of pieces of pixel data are individually multiplied by said integer-converted interpolation coefficients for every said predetermined number of pixels;
   (c-2) storing said integer-converted interpolation coefficients partitioned in said coefficient table in a predetermined sequence such that in said predetermined sequence, said plurality of pieces of pixel data are repeatedly multiplied by said integer-converted interpolation coefficients partitioned; and
   (c-3) associating the number of skips with said integer-converted interpolation coefficients partitioned to store said number of skips in said coefficient table, said number of skips defining whether to skip said integer-converted interpolation coefficients partitioned for a predetermined number of pixels and multiply said plurality of pieces of pixel data by said integer-converted interpolation coefficients partitioned or to multiply said plurality of pieces of pixel data by said integer-converted interpolation coefficients partitioned without skip.

5. The method for creating a coefficient table according to claim 4, wherein in said step (c-2), said integer-converted interpolation coefficients partitioned are repeatedly multiplied in said predetermined sequence in cycles corresponding to said U-times.

6. The method for creating a coefficient table according to claim 4, wherein in said step (b-1), said predetermined number by which 2 is raised is defined by a bit count of said pixel data.

7. An image scaling processor that converts input image data to U/D times (U and D are natural numbers) as output image data, the processor comprising:
   a coefficient table storing interpolation coefficients created by the method for creating a coefficient table according to claim 1;
   a multiplier that multiplies each of pieces of pixel data constituting said input image data and each of said interpolation coefficients stored in said coefficient table;
   an adder that repeatedly adds pieces of multiplied data output from said multiplier and obtains a total sum of said pieces of multiplied data for a predetermined number of said pieces of pixel data;
   a selector that outputs a total sum of said pieces of multiplied data at a timing at which the total sum of said pieces of multiplied data is obtained for the predetermined number of said pieces of pixel data; and
   a shift circuit that shifts an output of said selector to adjust a bit count of said output image data to a bit count of said input image data.

8. An image scaling processor that converts input image data to U/D times (U and D are natural numbers) as output image data, the processor comprising:
   a coefficient table storing interpolation coefficients created by the method for creating a coefficient table according to claim 4;
   a multiplier that multiplies each of pieces of pixel data constituting said input image data and each of said interpolation coefficients stored in said coefficient table;
   an adder that repeatedly adds pieces of multiplied data output from said multiplier and obtains a total sum of said pieces of multiplied data for a predetermined number of said pieces of pixel data;
   a selector that outputs a total sum of said pieces of multiplied data at a timing at which the total sum of said pieces of multiplied data is obtained for the predetermined number of said pieces of pixel data; and
   a shift circuit that shifts an output of said selector to adjust a bit count of said output image data to a bit count of said input image data.

* * * * *